United States Patent
Anderson

(10) Patent No.: US 6,851,886 B2
(45) Date of Patent: Feb. 8, 2005

(54) KNEE JOINT ASSEMBLY

(75) Inventor: Jack Conan Anderson, Madrid, IA (US)

(73) Assignee: Deere & Company, Moline, IL (US)

( * ) Notice: Subject to any disclaimer, the term of this patent is extended or adjusted under 35 U.S.C. 154(b) by 18 days.

(21) Appl. No.: 10/376,167

(22) Filed: Feb. 28, 2003

(65) Prior Publication Data

US 2004/0170472 A1 Sep. 2, 2004

(51) Int. Cl.$^7$ ............................................. B25G 3/28
(52) U.S. Cl. ..................... 403/355; 403/271; 403/272; 403/319; 403/378; 403/379.4; 403/379.5; 56/208; 56/228; 56/DIG. 10; 280/93.51
(58) Field of Search ................................. 403/265, 267, 403/270–272, 315, 316, 319, 355, 377, 378, 379.2–379.5, 230, 238, 256, 258, 260, 261; 180/311; 280/93.511, 93.51, 781, 785; 56/14.7, 208, DIG. 10, 209, 228; 411/171, 511

(56) References Cited

U.S. PATENT DOCUMENTS

| | | | | |
|---|---|---|---|---|
| 2,841,427 A | * | 7/1958 | Sheppard | 403/74 |
| 4,189,249 A | * | 2/1980 | Gaines et al. | 403/27 |
| 4,483,552 A | * | 11/1984 | Dorscht | 280/6.15 |
| 5,603,583 A | * | 2/1997 | Jackson | 403/320 |
| 5,672,036 A | * | 9/1997 | Medal | 411/82 |
| 6,609,435 B1 | * | 8/2003 | Wolff | 74/473.36 |

* cited by examiner

Primary Examiner—Daniel P. Stodola
Assistant Examiner—Michael P. Ferguson

(57) ABSTRACT

A knee joint assembly for an agricultural implement or a vehicle includes a relatively short knee casting with an apertured end of rectangular cross section which is inserted in a mating steel knee tube. The apertures in the casting end align with beveled apertures in the side walls of the knee tube. Steel pins of length approximately equal to the spacing of the side walls are pressed into the casting through the beveled apertures. Groove welds then secure the steel pins to the knee tube. The casting is relatively small and does not require any welding. Inexpensive ductile iron and common steel tubes can be used for most or all of the assemblies on a machine. The apertured end of the casting includes concave walls to accommodate knee tube concavity and weld flash on the inside of the knee tube.

18 Claims, 2 Drawing Sheets

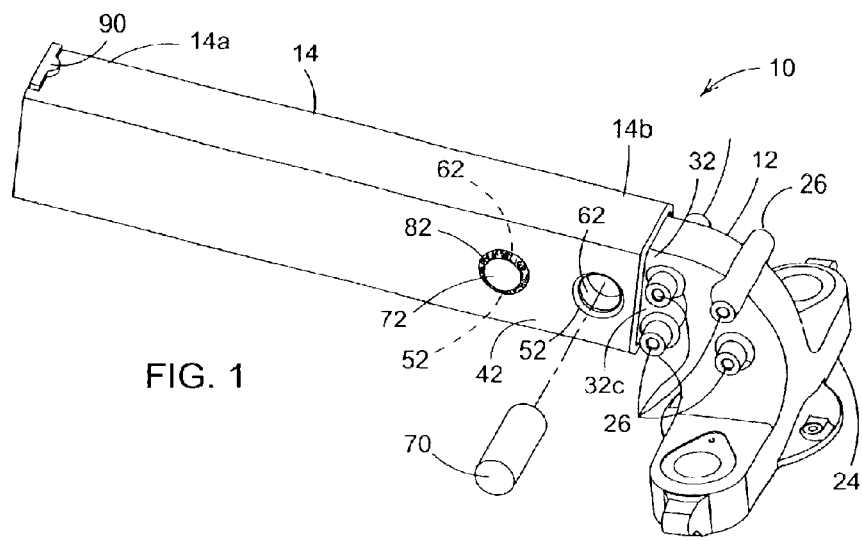
FIG. 1
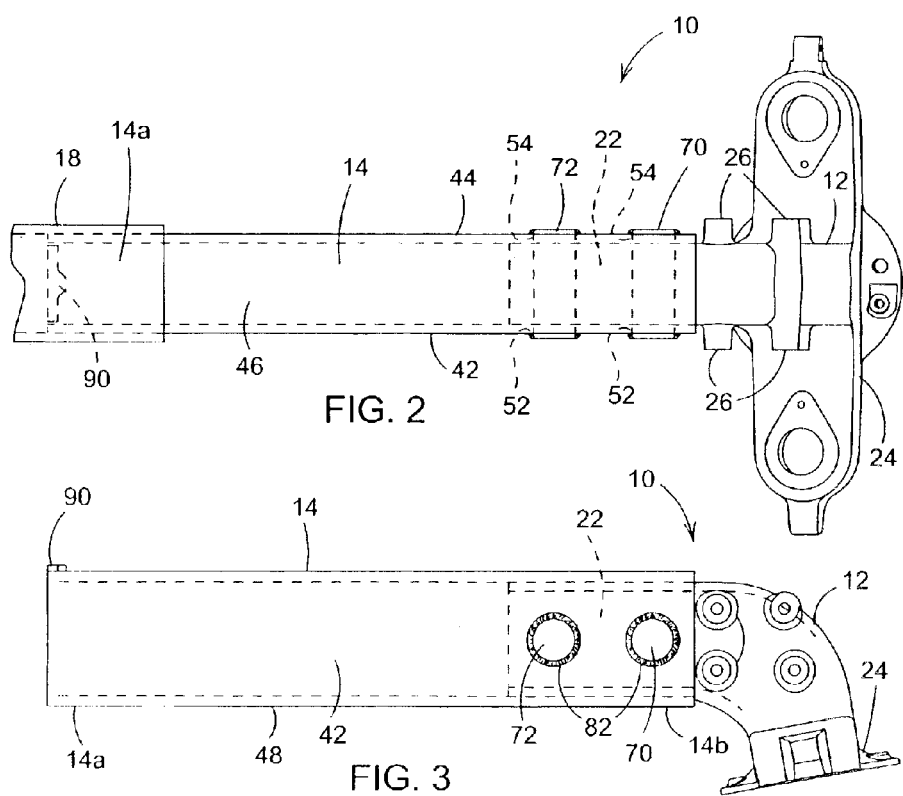
FIG. 2
FIG. 3

KNEE JOINT ASSEMBLY

FIELD OF THE INVENTION

The present invention relates generally to agricultural implements and vehicles and, more specifically, to adjustable tread axle assemblies with knee joints for such implements and vehicles.

BACKGROUND OF THE INVENTION

Adjustable tread axle assemblies are used in many agricultural devices for setting wheel spacing to accommodate a particular row spacing, implement configuration or the like. For example, in some harvesters and self-propelled field sprayers, a long casting includes a knee joint at one end which supports a king pin assembly. The opposite end of the casting is slidably received within a tube fixed to the sprayer frame. One problem with such an assembly is the high cost for machining the long casting. Also, machining a full casting may be limited because of the machine bed size and travel or machining center requirements for the process. Many knee joints have to be welded so that steel rather than a less expensive ductile iron must be used. Additional machining is required to provide pads on the casting which contact shims necessary to reduce looseness between the casting and the receiving tube. Often, the left-hand and right-hand assemblies have to be separately manufactured with few if any common parts, adding to the expense and the number of parts required.

SUMMARY OF THE INVENTION

It is therefore an object of the present invention to provide an improved knee joint assembly. It is a further object to provide such an assembly which overcomes most or all of the aforementioned problems.

It is another object of the present invention to provide an improved knee joint assembly which is less expensive than at least most previously available assemblies. It is a further object to provide such an assembly which facilitates use of one or more common components for most or all of the axle assemblies on an implement or vehicle.

It is a further object of the present invention to provide an improved knee joint assembly which does not require a welded casting and which reduces machining requirements and lowers manufacturing costs. It is another object to provide such an assembly which obviates machined pads to run against shims.

A knee joint assembly includes a relatively short knee casting with an apertured end of generally rectangular cross section which is inserted in a mating steel knee tube. The apertures in the casting end align with beveled apertures in the side walls of the knee tube. Steel pins of length approximately equal to the spacing of the side walls are pressed into the casting through the beveled apertures. Groove welds then secure the steel pins to the knee tube. The beveled apertures and pin surfaces cooperate to form a strong, reliable J-weld which is recessed from the inner surfaces of the side walls. The casting is concave in the outward direction adjacent the casting apertures for accommodating knee tube concavity and providing clearance for any weld flash on the inside of the tube. A reliable and tight load path is provided from the knee casting to the steel tube through the pins via the press fit into the casting and the groove weld between the tube and pins.

Since the casting is relatively small and does not have to be welded, it can be manufactured from inexpensive ductile iron and easily machined as necessary. The same steel tube can be used for most or all of the assemblies on a machine, even if different spindle structures are utilized, so that parts requirements and manufacturing costs are reduced. The relatively simple pin and press fit construction reduces assembly time. The steel tube facilitates use of tread adjust shims while eliminating the need for machined pads to run against the shims.

These and other objects, features and advantages of the present invention will become apparent upon reading the following detailed description in view of the drawings.

BRIEF DESCRIPTION OF THE DRAWINGS

FIG. 1 is a perspective view of a knee joint assembly, with one of the connecting pins removed prior to welding to better show the pin and aperture structure.

FIG. 2 is a top view of the assembly of FIG. 1.

FIG. 3 is a front view of the assembly of FIG. 1.

DESCRIPTION OF THE PREFERRED EMBODIMENT

Referring now to FIG. 1, a knee joint assembly 10 is shown which includes a knee element 12 received within the outer end of a knee tube 14. The inner end of the knee tube 14 is slidingly received within a support tube 18 (see FIG. 2) connected to the frame of a vehicle or implement to facilitate tread adjustments.

Figure 5:
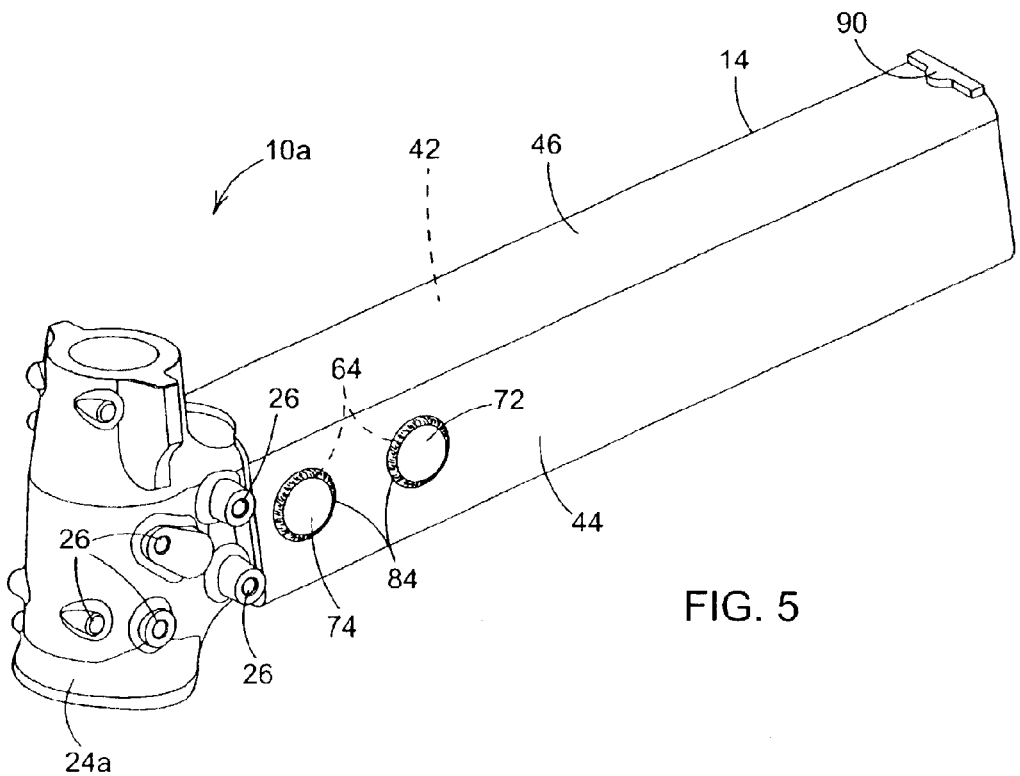
FIG. 5 is a perspective view of a knee joint assembly, for the side of a vehicle opposite that shown for FIG. 1 and with a single spindle support structure.

The knee element 12 is shown as a unitary casting made from ductile iron or similar material. The element includes an inwardly directed support end 22 and a downwardly directed spindle mount area 24 for supporting a dual spindle cushion wheel assembly (not shown). Other types of mounts, such as a conventional single spindle mount area 24a (FIG. 5), may also be used with a variety of different wheel assemblies. Mounting bosses 26 are cast into a transition area between the support end 22 and the spindle mount area 24 for supporting steering assembly elements (not shown) or other additional hardware.

Figure 4:
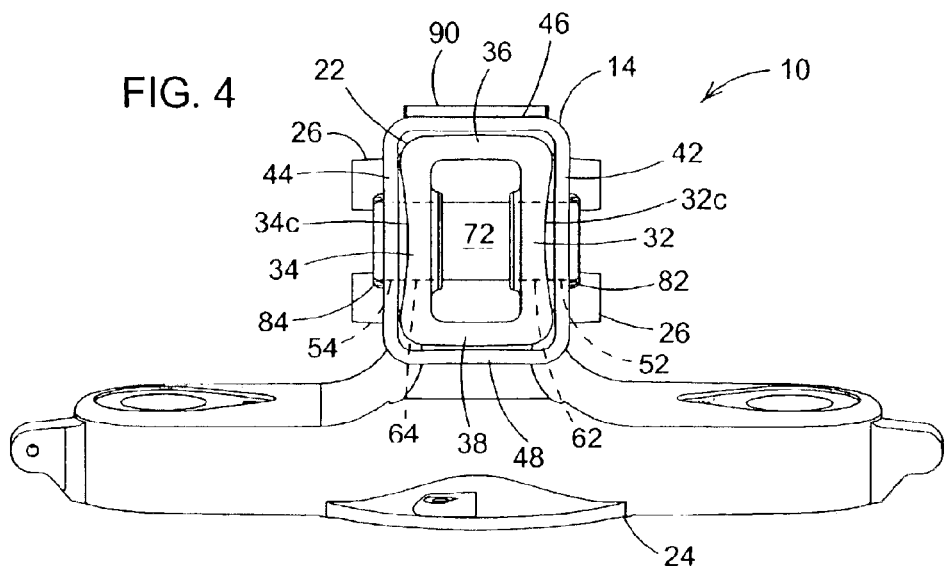
FIG. 4 is an end view of the knee tube assembly of FIG. 1 looking outwardly in the direction of the knee element.

The knee tube 14 is of hollow rectangular construction (FIG. 4), and the casting support end 22 has a generally complimentary shape for receipt within the outer end of the knee tube. The tube 14 is made from steel or similar weldable material. As shown, the support end 22 is also hollow with opposed side walls 32 and 34 joined by upper and lower walls 36 and 38. The side walls 32 and 34 have concave areas 32c and 34c adjacent inner walls of the corresponding side walls 42 and 44 of the knee tube 14. The knee tube side walls 42 and 44 are connected by top and bottom walls 46 and 48. The symmetry of the knee tube 14 facilitates use on either side of a vehicle or implement. For example, the knee tube 14 of FIG. 1 is utilized on one side of the vehicle with the side wall 42 facing a first direction (towards the viewer), and in FIG. 5 the tube 14 is utilized on the opposite side of the vehicle with the opposite side wall 44 facing the first direction.

The knee tube 14 includes an inner end 14a slidably received by the support tube 18 connected to the frame of the vehicle or implement and an outer end 14b which receives the support end 22 of the knee element 12. The walls 42 and 44 of the outer end 14b are apertured at 52 and 54, respectively. Corresponding knee element apertures 62 and 64 with inwardly directed bosses formed in the concave areas of the support end side walls 32 and 34 align with the apertures 52 and 54. First and second friction fit pins 70 and 72 made of steel or similar weldable material and having slightly tapered ends are driven into the knee apertures 62 and 64 through the apertures 52 and 54. The ends of the pins 70 and 72 project slightly outwardly of the tube side walls 42 and 44.

Connecting structure, shown as groove welds 82 and 84 in the drawing figures, secure the ends of the pins to the side walls 42 and 44. The apertures 52 and 54 are beveled and cooperate with the tapers on the end of the pins 70 and 72 to define a strong, reliable J-weld partially recessed from the inner surfaces of the side walls 42 and 44. The concave areas 32c and 34c accommodate any concavity of the side walls 42 and 44 and provide clearance for flash from the welds 82 and 84 that may be present on the insides of the walls. A reliable and tight load path is provided between the knee element 12 and the tube 14 through the press fit connection of the pins 70 and 72 into the element 12 and through the strong groove welds 82 and 84 between the tube walls and the pin ends.

Tread adjust shims 90 are mounted on one or more of the walls of the innermost end of the tube 14 to provide contact surface structure between the innermost end and the support tube 18. The shims 90 reduce looseness between the tubes and facilitate telescoping of the tubes relative to each other during wheel tread adjustments.

Having described the preferred embodiment, it will become apparent that various modifications can be made without departing from the scope of the invention as defined in the accompanying claims.

What is claimed is:

1. A knee joint assembly including a casting having a support end and a connecting end of generally rectangular cross section with at least one casting aperture passing through opposed sides of the casting connecting end, a knee tube having an apertured end of generally rectangular cross section matingly receiving the connecting end, the support end of the casting including a wheel assembly support angled with respect to the connecting end, the apertured end including opposed side walls with tube apertures aligning with the casting aperture as the knee tube receives the connecting end, a metal pin extending through the tube apertures and press fitted into the casting aperture, and a weld connecting the metal pin with the knee tube, wherein a tight load path is provided between the wheel assembly support and the knee tube through the weld and press fit connection between the metal pin and the casting.

2. The assembly as set forth in claim 1 wherein the pin is cylindrical, the tube apertures include beveled portions, and the weld comprises a groove weld located in the beveled portions, and wherein the opposed sides of the casting include recessed areas providing clearance between the groove weld and the opposed sides.

3. The assembly as set forth in claim 1 further comprising a second casting aperture and a second tube aperture, and a second pin securing the casting to the knee tube.

4. A knee joint assembly including a casting having a support end and a connecting end with at least one casting aperture, a knee tube having an apertured end matingly receiving the connecting end, the apertured end including a tube aperture aligning with the casting aperture, a metal pin extending through the tube aperture and press fitted into the casting aperture, a weld connecting the metal pin with the knee tube; and wherein the connecting end includes an inwardly concave side wall defining a recessed area adjacent the casting aperture for providing clearance between the casting and the knee tube in an area adjacent the weld.

5. A knee joint assembly including a casting having a support end and a connecting end with offset casting apertures, a knee tube having tube apertures and receiving the connecting end, the tube apertures aligning with the casting apertures, pin structure extending through the tube apertures and the casting apertures, and connection structure securing the pin structure to the knee tube, wherein the pin structure comprises a metal pin, the connection structure comprises a weld between the metal pin structure and the knee tube, and wherein the connecting end includes side walls concave inwardly adjacent the weld and the casting apertures extend though the side walls.

6. The assembly as set forth in claim 5 wherein the pin structure is press fitted into the casting aperture.

7. The assembly as set forth in claim 5 wherein the knee tube includes an outer end and an inner end, and further comprising a support tube telescopingly receiving the inner end, wherein the tube apertures are located in the outer end.

8. The assembly as set forth in claim 5 wherein the knee tube comprises a steel tube and the casting comprises a ductile iron casting, the ductile iron casting being devoid of welding.

9. A knee joint assembly including a support tube, a knee joint having a wheel support and a connecting end, the connecting end received by the support tube and including at least one knee joint aperture, pin structure received by the knee joint aperture and having a friction fit within the knee joint aperture, and connection structure securing the pin structure to the support tube, wherein the connecting end of the knee joint includes a concave wall adjacent the connection structure.

10. The assembly as set forth in claim 9 wherein the support tube includes opposed side wall areas with apertures, and wherein the pin structure extends through the apertures.

11. The assembly as set forth in claim 10 wherein connection structure comprises welds connecting the pin structure to the side wall areas, the concave wall providing clearance between the welds and the connecting end.

12. The assembly as set forth in claim 9 wherein the support tube includes a hollow tubular member of generally rectangular cross section, and wherein the connecting end has a complimentary cross section for receipt within the hollow tubular member.

13. A knee joint assembly including a support tube, a knee joint having a wheel support and a connecting end, the connecting end received by the support tube and including at least one knee joint aperture, pin structure received by the knee joint aperture and having a friction fit within the knee joint aperture, and connection structure securing the pin structure to the support tube; wherein the support tube includes a hollow tubular member of generally rectangular cross section, wherein the connecting end has a complimentary cross section for receipt within the hollow tubular member; and wherein the connecting end of the knee joint includes a concave wall adjacent the connection structure.

14. The assembly as set forth in claim 13 wherein the knee joint comprises a knee joint casting and the connection structure includes a weld securing the pin structure to the support tube.

15. The assembly as set forth in claim 14 wherein the knee joint casting is fabricated from ductile iron and is substantially devoid of welds, and the support tube comprises a steel tube of generally rectangular cross section.

16. A knee joint assembly including a support tube, a knee joint having a wheel support and a connecting end, the connecting end received by the support tube and including at least one knee joint aperture, pin structure received by the knee joint aperture and having a friction fit within the knee joint aperture, connection structure securing the pin structure to the support tube, wherein the knee joint comprises a knee joint casting and the connection structure includes a weld securing the pin structure to the support tube, and wherein the knee joint casting includes a concave portion adjacent the weld.

17. The assembly as set forth in claim 16 wherein the support tube is slidably received by a complimentary frame tube for supporting the knee joint outwardly of the frame tube.

18. The assembly as set forth in claim 17 including shim structure supported between the support tube and the frame tube.

* * * * *